Feb. 10, 1925.
G. MUELLER
1,525,880
ATTACHMENT FOR BREAD WRAPPING MACHINES
Filed Jan. 31, 1922    2 Sheets-Sheet 2
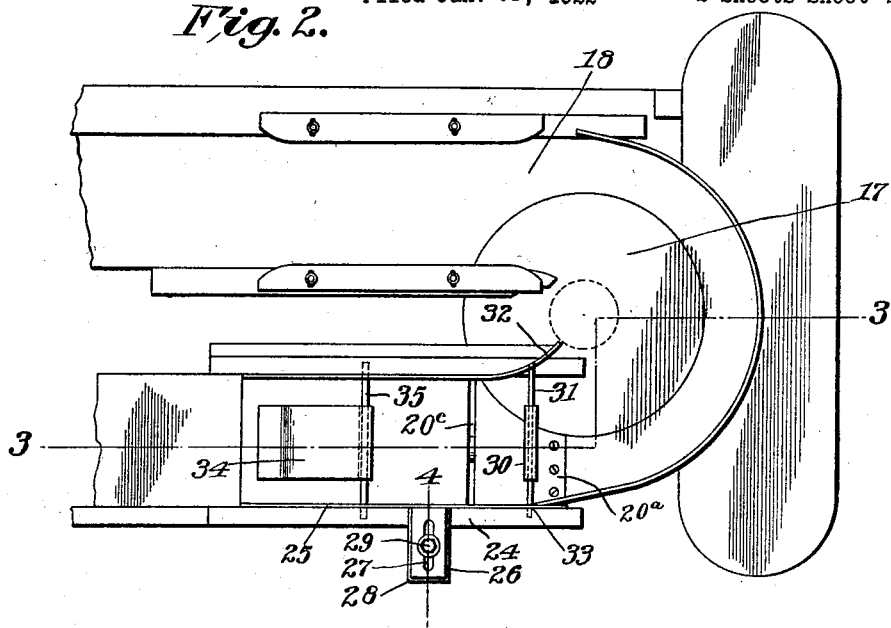
Fig. 2.
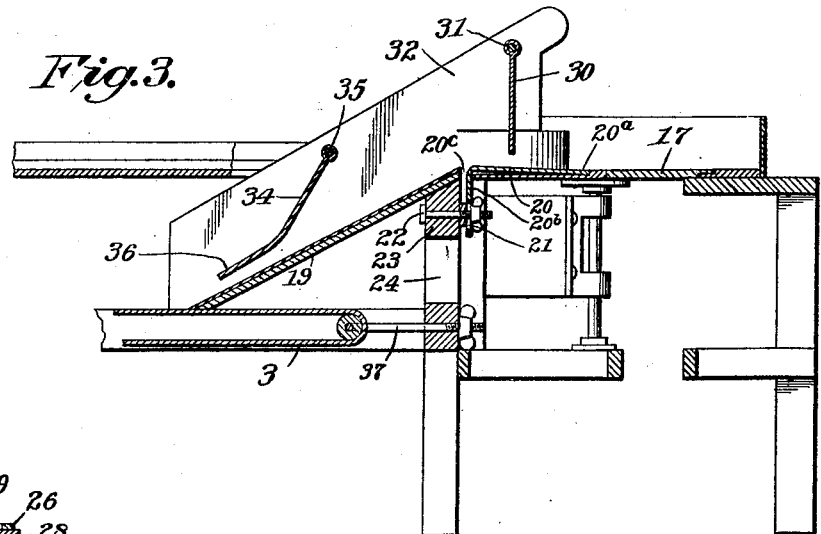
Fig. 3.
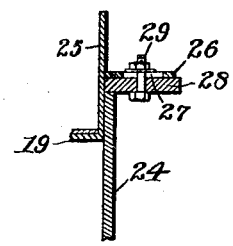
Fig. 4.
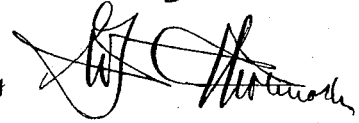
Inventor
George Mueller,
By
Attorney Patented Feb. 10, 1925.

1,525,880

UNITED STATES PATENT OFFICE.

GEORGE MUELLER, OF SALT LAKE CITY, UTAH.

ATTACHMENT FOR BREAD-WRAPPING MACHINES.

Application filed January 31, 1922. Serial No. 533,054.

*To all whom it may concern:*

Be it known that I, GEORGE MUELLER, a citizen of the United States, residing at Salt Lake City, in the county of Salt Lake, State of Utah, have invented new and useful Improvements in Attachments for Bread-Wrapping Machines, of which the following is a specification.

The invention relates to improvements in a bread loaf conveyor attachment for bread wrapping machines.

The object of the present invention is to improve the construction of the bread loaf conveyor attachment for bread wrapping machines, shown and described in my application for Letters Patent, filed August 20, 1921, Serial No. 404,752, now Patent 1,491,489, April 22, 1924, and to increase the efficiency of the upper pivoted plate or member which is arranged over the turntable at right angles to the travel of the loaves to space the loaves regularly and to check and square the wrapped loaves or packages so that the same will enter the inclined chute in proper position transversely of the same.

A further object of the invention is to equip the attachment with an adjustable plate located adjacent the upper end of the inclined chute and to provide the latter with adjustable means for guiding the loaves so that the same will be delivered to and travel down the inclined chute in proper position.

It is also an object of the invention to provide means for causing any crumbs of crust or particles of lubricating wax, used on the conveying means, to fall through the machine and not interfere with the regular spacing of the loaves in passing down the inclined chute.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:—

Figure 2 is a plan view of the same.

Figure 3 is a longitudinal sectional view on the line 3—3 of Figure 2.

Figure 4 is a detail sectional view on the line 4—4 of Figure 2.

Figure 1:
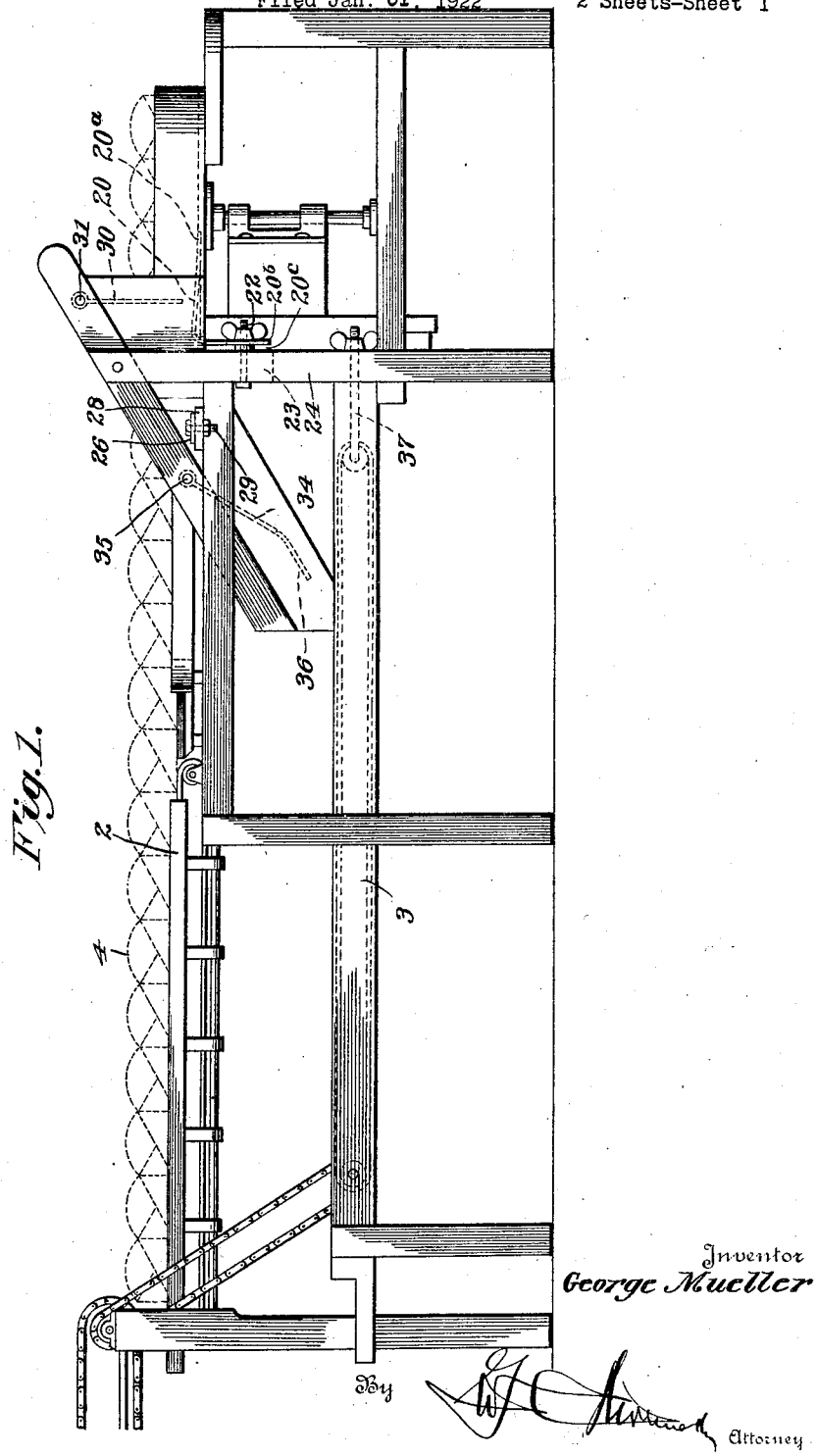
Figure 1 is a side elevation of a bread loaf conveyor attachment for bread wrapping machines, showing my improvements.

Referring to the accompanying drawings illustrating the attachment of the aforesaid application with the improved construction applied thereto, 2 designates the upper longitudinal conveyor and 3 the lower longitudinal conveyor for carrying the wrapped loaves or packages 4 away from the discharge end of the bread wrapping machine and for returning them to the machine in a position adjacent to the receiving end of the said bread wrapping machine to enable the bread to be fed into the bread wrapping machine and removed therefrom by one person without his leaving his position at the place where the bread is fed into the bread wrapping machine. The conveying means for delivering the wrapped loaves on to the rotary turntable 17, as in the aforesaid application, comprises the upper conveyor 2 and the table 18, which is located at the rear end of the upper conveyor. The turntable extends from the rear portion of the said conveying means across the end of the machine to an inclined chute 19 and it is adapted to transfer the loaves from the table 18 to the said inclined chute 19. The inclined chute, which is fixed to the frame of the machine, is located above and extends downwardly to the rear portion of the lower conveyor and transfers the loaves from the turntable to the said lower conveyor.

The inclined chute, which is metal lined, is arranged to receive the loaves from the adjustable plate 20 located at the receiving end of the chute and extending longitudinally of the machine and secured at its inner or rear end 20ª to the frame of the machine by screws or other suitable fastening devices and its front end is provided with a depending flange or portion 20ᵇ having a vertical slot 21, through which passes a bolt 22 or other suitable fastening device for adjustably securing the front end of the plate or member to a portion 23 of the frame 24 of the attachment. The adjustable plate 20 is adapted to be raised and lowered and its front depending flange or portion 20ᵇ is spaced from the upper end of the inclined chute 19, about a half an inch to provide an intervening space between the depending plate or portion 20ᵇ and the chute to allow any crumbs of crust or particles of lubricating wax used on the conveyors, to fall through the machine and not interfere with the regular spacing of the loaves in passing the same down the inclined chute 19. This space may be of any desired size and any crumbs, particles of wax or other accumulation will be positively discharged from the machine through the said space 20ᶜ. The inclined chute is equipped with side guides and the guide 25 at the outer side of the chute is adjustable laterally and adapted to be moved inwardly and outwardly to arrange the said guide in proper position for guiding the loaves as the same leave the rotary turntable. The outer guide is provided intermediate of its end with a laterally extending plate or member 26, preferably disposed horizontally, as shown, and having a slot 27 extending longitudinally of the said plate or member 26 and arranged upon a transversely disposed projecting supporting arm 28 of the frame 24. The laterally extending plate or member of the adjustable guide 25 is secured to the laterally extending arm 28 by means of a bolt 29 or other suitable fastening device, which firmly clamps the plate or member to the projecting arm 28. By this construction the guide of the inclined chute is set in proper relation to the turntable to accommodate and guide the loaves of the size wrapped by the machine.

The rotary turntable may be constructed in any desired manner and actuated by any suitable means and suspended over the adjustable plate is a vertical leaf or plate 30 arranged at right angles to the travel of the loaves and adapted to space the loaves regularly in line to pass over the adjustable plate and down the inclined chute, after leaving the rotary turntable 17. The plate or leaf 20 is hung from a pivot 31, preferably fixed to the inner wall 32 and piercing the outer wall or guide 25 and slidably arranged in an aperture 33 of the said outer wall or guide 25, so as not to interfere with the lateral adjustment of the same. The leaf or plate 30 operates to check and square the loaves or packages at the outer end of the inclined chute and the said adjustable plate or member, and the leaf or plate 30 holds a loaf until the next succeeding loaf presses against the first loaf and forces the same on to the inclined chute and each of the loaves leaving the rotary turntable will be delivered to the inclined chute in proper position transversely of the said chute. When the pivoted depending plate or member 30 is engaged by a loaf it is swung forwardly to an inclined position and its lower free portion yieldably bears upon the loaf to check and square the latter, as before explained. The inclined chute 19 is also provided with a lower leaf or plate 34, mounted on a transverse pivot 35 and consisting of an inclined upper portion arranged at an acute angle to the bottom of the inclined chute, and a lower portion 36 which is disposed in approximate parallelism with the bottom of the chute. The said plate or member 34 operates similar to the lower inclined plate or member of the aforesaid application and yieldably bears upon the loaves passing down the inclined chute. The adjustable plate 20 and the arrangement of the vertical leaf or plate 30 increase the effectiveness of the attachment in transferring the loaves from the rotary turntable to the inclined chute.

The lower conveyor, which is driven from the discharge end of the machine, extends a short distance in rear of the lower end of the inclined chute and terminates short of the shaft of the turntable and is equipped at its rear end with a belt tightening device 37 adapted to take up the slack in the belt of the lower conveyor and maintain the latter at the desired tension, so that the lower conveyor may be regulated and kept tight.

What is claimed is:

1. A conveyor attachment for a bread wrapping machine, including a rotary turntable, conveying means extending from the discharge end of the machine to the turntable, an inclined chute extending downwardly from the turntable and spaced at its upper end from the adjacent portion of the attachment to provide an intervening space for the discharge of crumbs and other accumulation to prevent the same from interfering with the passage of loaves to the chute.

2. A conveyor attachment for a bread wrapping machine, including a rotary turntable, conveying means extending from the discharge end of the machine to the turntable, an inclined chute extending from the turntable and a plate arranged to receive loaves from the rotary turntable and extending to the upper end of the inclined chute and adjustable upwardly and downwardly.

3. A conveyor attachment for a bread wrapping machine, including a rotary turntable, conveying means extending from the discharge end of the machine to the turntable, an inclined chute extending from the turntable and a plate arranged to receive loaves from the rotary turntable and extending to the upper end of the inclined chute and secured at its rear portion, and provided at its front portion with means for raising and lowering it.

4. A conveyor attachment for a bread wrapping machine, including a rotary turntable, conveying means extending from the discharge end of the machine to the turntable, an inclined chute extending from the turntable and a plate arranged to receive loaves from the rotary turntable and extending to the upper end of the inclined chute and secured at its rear portion, and provided at its front end with a depending flange and having means for adjustably securing the flange for raising and lowering the said plate.

5. A conveyor attachment for a bread wrapping machine, including a rotary turntable, conveying means extending from the discharge end of the machine to the turntable, an inclined chute arranged to receive loaves from the turntable and provided with an outer side wall guide arranged to guide the loaves from the turntable and having a laterally extending plate, a supporting arm extending laterally from the chute and receiving the said plate, and means for adjustably securing the plate to the laterally extending arm.

6. A conveyor attachment for a bread wrapping machine, including a rotary turntable, conveying means extending from the discharge end of the machine to the turntable, an inclined chute extending downwardly from the turntable, a plate arranged to receive loaves from the turntable and extending from the same to the chute and fixed at its inner end and adjustably secured at its front end for raising and lowering it, and a pivoted vertically disposed plate hung from a point above the said plate and extending downwardly into the path of the loaves and adapted to be engaged by the same, whereby the free lower portion of the pivoted plate will bear against the loaves.

7. A conveyor attachment for a bread wrapping machine including a rotary turntable, conveying means extending from the discharge end of the machine to the turntable, an inclined chute extending from the turntable and a plate arranged to receive loaves from the rotary turntable and extending to the upper end of the inclined chute and adjustable upwardly and downwardly, said plate being provided adjacent the said chute with an attaching portion spaced from the chute to provide an intervening space for the discharge of crumbs and other accumulation to prevent the same from interfering with the passage of the loaves to the chute.

In testimony whereof I have hereunto set my hand.

GEORGE MUELLER.